US011287711B2

(12) United States Patent
Liu et al.

(10) Patent No.: US 11,287,711 B2
(45) Date of Patent: Mar. 29, 2022

(54) DISPLAY PANEL, METHOD FOR MANUFACTURING THE SAME AND DISPLAY DEVICE

(71) Applicants: BOE TECHNOLOGY GROUP CO., LTD., Beijing (CN); HEFEI XINSHENG OPTOELECTRONICS TECHNOLOGY CO., LTD., Anhui (CN)

(72) Inventors: Haifeng Liu, Beijing (CN); Xiaoye Ma, Beijing (CN); Rui Ma, Beijing (CN)

(73) Assignees: BOE TECHNOLOGY GROUP CO., LTD., Beijing (CN); HEFEI XINSHENG OPTOELECTRONICS TECHNOLOGY LTD., Anhui (CN)

( * ) Notice: Subject to any disclaimer, the term of this patent is extended or adjusted under 35 U.S.C. 154(b) by 772 days.

(21) Appl. No.: 16/074,192

(22) PCT Filed: Jan. 4, 2018

(86) PCT No.: PCT/CN2018/071136
§ 371 (c)(1),
(2) Date: Jul. 31, 2018

(87) PCT Pub. No.: WO2018/196438
PCT Pub. Date: Nov. 1, 2018

(65) Prior Publication Data
US 2021/0208464 A1 Jul. 8, 2021

(30) Foreign Application Priority Data

Apr. 28, 2017 (CN) .......................... 201710300556.6

(51) Int. Cl.
*G02F 1/1362* (2006.01)
*G02F 1/1343* (2006.01)
*G02F 1/1339* (2006.01)

(52) U.S. Cl.
CPC .. *G02F 1/136295* (2021.01); *G02F 1/134381* (2021.01); *G02F 1/136209* (2013.01);
(Continued)

(58) Field of Classification Search
CPC ......... G02F 1/136295; G02F 1/134381; G02F 1/134363; G02F 1/1339; G02F 1/13398; G02F 2201/121; G02F 2201/123
See application file for complete search history.

(56) References Cited

U.S. PATENT DOCUMENTS

2013/0271683 A1    10/2013  Jang et al.
2015/0346564 A1*   12/2015  Moriwaki ........... G02F 1/13439
                                                              349/43
(Continued)

FOREIGN PATENT DOCUMENTS

CN    103926759 A    7/2014
CN    103941453 A    7/2014
(Continued)

OTHER PUBLICATIONS

Search Report and Written Opinion for International Application No. PCT/CN2018/071136 dated Apr. 9, 2018.

*Primary Examiner* — Angela K Davison
(74) *Attorney, Agent, or Firm* — Calfee, Halter & Griswold LLP

(57) ABSTRACT

A display panel, a method for manufacturing a display panel, and a display device are provided. The display panel includes a first substrate and a second substrate disposed opposite to each other. The first substrate is provided with a first common electrode and a pixel electrode disposed in
(Continued)

different layers, and the first common electrode is closer to the second substrate comparing with the pixel electrode. The second substrate is provided with a second common electrode, and the second electrode is electrically connected to the first common electrode. An orthographic projection of the second common electrode on the first substrate has an overlapping area with data lines on the first substrate, and an orthographic projection of the first common electrode on the first substrate has no overlapping area with the data lines.

12 Claims, 7 Drawing Sheets

(52) U.S. Cl.
CPC .... *G02F 1/13398* (2021.01); *G02F 1/134363* (2013.01); *G02F 2201/121* (2013.01); *G02F 2201/123* (2013.01)

(56) References Cited

U.S. PATENT DOCUMENTS

| | | | |
|---|---|---|---|
| 2016/0062203 A1* | 3/2016 | Ono | G02F 1/134363 349/43 |
| 2016/0246128 A1 | 8/2016 | Zhang et al. | |
| 2017/0102574 A1* | 4/2017 | Kim | G02F 1/1368 |

FOREIGN PATENT DOCUMENTS

| | | |
|---|---|---|
| CN | 105093754 A | 11/2015 |
| CN | 106054471 A | 10/2016 |
| CN | 106886108 A | 6/2017 |

* cited by examiner

DISPLAY PANEL, METHOD FOR MANUFACTURING THE SAME AND DISPLAY DEVICE

RELATED APPLICATION

The present application is the U.S. national phase entry of PCT/CN2018/071136, with an international filing date of Jan. 4, 2018, which claims the benefit of Chinese Patent Application No. 201710300556.6, filed on Apr. 28, 2017, the entire disclosure of which are incorporated herein by reference.

TECHNICAL FIELD

The present disclosure relates to the field of display technologies, particularly to a display panel, a method for manufacturing a display panel, and a display device.

BACKGROUND

As a flat panel display device, a thin film transistor liquid crystal display (TFT-LCD) is increasingly used in the field of high performance display due to its characteristics such as small size, low power consumption, no radiation, relatively low manufacturing cost, and so on.

SUMMARY

In some exemplary embodiments of the present disclosure, display panel is provided including a first substrate and a second substrate disposed opposite to each other, wherein the first substrate is provided with a first common electrode and a pixel electrode disposed in different layers, and the first common electrode, comparing with the pixel electrode, is closer to the second substrate. The second substrate is provided with a second common electrode, and the second common electrode is electrically connected to the first common electrode. An orthographic projection of the second common electrode on the first substrate has an overlapping area with data lines on the first substrate, and an orthographic projection of the first common electrode on the first substrate has no overlapping area with the data lines.

In some embodiments, the second common electrode includes a plurality of first strip sub-electrodes parallel to the data lines, and each of the first strip sub-electrodes completely covers a corresponding one of the data lines.

In some embodiments, the second common electrode further include a plurality of second strip sub-electrodes which are crosswise disposed with respect to and electrically connected to the first strip sub-electrodes, and each of the second strip sub-electrodes completely covers a corresponding gate line or a corresponding common electrode line on the first substrate.

In some embodiments, a plurality of spacers for supporting the first substrate and the second substrate are disposed on the second substrate and in a display area, wherein the spacers are located on a side of the second strip sub-electrode facing away from the first substrate and correspond to a position of the second strip sub-electrode.

In some embodiments, on the first substrate, a liner layer is disposed on a side of the first common electrode facing away from the second substrate and corresponds to position of the spacer.

In some embodiments, the display panel further includes a sealant between the first substrate and the second substrate, wherein one side of the sealant is in contact with the first common electrode and the other side of the sealant is in contact with the second common electrode. Conductive gold balls are uniformly distributed in the sealant. The conductive gold balls are used to electrically connect the first common electrode and the second common electrode.

In some embodiments, the spacer includes a metallic material.

In some embodiments, the second substrate includes a black matrix. The second common electrode is located on a side of the black matrix close to the first substrate. Line widths of the first strip sub-electrode and the second strip sub-electrode is larger than a line width of the black matrix.

In some embodiments, a difference between one-sided line widths of the first strip sub-electrode and the black matrix ranges from 1.5 μm to 2.5 μm.

Some other exemplary embodiments of the present disclosure provides a display device including any of the display panels described above.

Further exemplary embodiments of the present disclosure provides a method for manufacturing a display panel, including manufacturing a first substrate, manufacturing a second substrate, and assembling the first substrate with the second substrate. Manufacturing the first substrate includes forming, on a first base substrate, a plurality of data lines by a patterning process; successively forming, on the first base substrate on which the data lines are formed, a pixel electrode and an insulating layer covering the pixel electrode by a patterning process; and, forming, on the first base substrate on which the insulating layer has been formed, a first common electrode in an area other than the data lines by a patterning process. Manufacturing the second substrate includes forming, on a second base substrate, a second common electrode at least at a preset position by a patterning process. Assembling the first substrate with the second substrate includes assembling the first substrate with the second substrate so that the preset position corresponds to positions of the data lines.

In some embodiments, forming the second common electrode at least at the preset position includes forming a transparent conductive material layer on the second base substrate; and performing a patterning process to the transparent conductive material layer to form a plurality of first strip sub-electrodes parallel to the data lines, wherein after the first substrate is assembled with the second substrate, each of the first strip sub-electrodes completely covers a corresponding one of the data lines.

In some embodiments, manufacturing the first substrate further includes forming, on the first base substrate, a plurality of gate lines and common electrode lines by a patterning process. Forming the second common electrode at least at a preset position further includes after forming the transparent conductive material layer, performing a patterning process to the transparent conductive material layer to form a plurality of second strip sub-electrodes crosswise disposed with respect to the first strip sub-electrodes, wherein after the first substrate is assembled with the second substrate, each of the second strip sub-electrodes completely covers a corresponding one of the gate lines or a corresponding one of the common electrode lines.

In some embodiments, manufacturing the second substrate further includes prior to forming a plurality of second strip sub-electrodes arranged to crosswise disposed with respect to the first strip sub-electrodes, forming a plurality of spacers on the second substrate and in a display area, wherein positions of the spacers correspond to positions of the second strip sub-electrodes.

In some embodiments, manufacturing the first substrate further includes prior to forming an insulating layer covering the pixel electrode by a patterning process, forming, on the first base substrate, the plurality of data lines and a liner layer by a single patterning process, wherein a position of the liner layer corresponds to the positions of the spacers.

In some embodiments, assembling the first substrate with the second substrate includes forming a sealant on the first substrate or the second substrate by a patterning process, wherein conductive gold balls are uniformly distributed in the sealant. One side of the sealant is in contact with the first common electrode, and the other side is in contact with the second common electrode. The conductive gold balls electrically connect the first common electrode with the second common electrode.

BRIEF DESCRIPTION OF THE DRAWINGS

In order to more clearly illustrate the technical solutions in embodiments of the present disclosure or in the related art, the drawings to be used for description of the embodiments or the related art will be briefly described below. Obviously, the drawings in the description below are merely some embodiments of the present disclosure, and other drawings can be further obtained by a person having ordinary skill in the art based on these drawings without spending inventive efforts.

DETAILED DESCRIPTION

Figure 1:
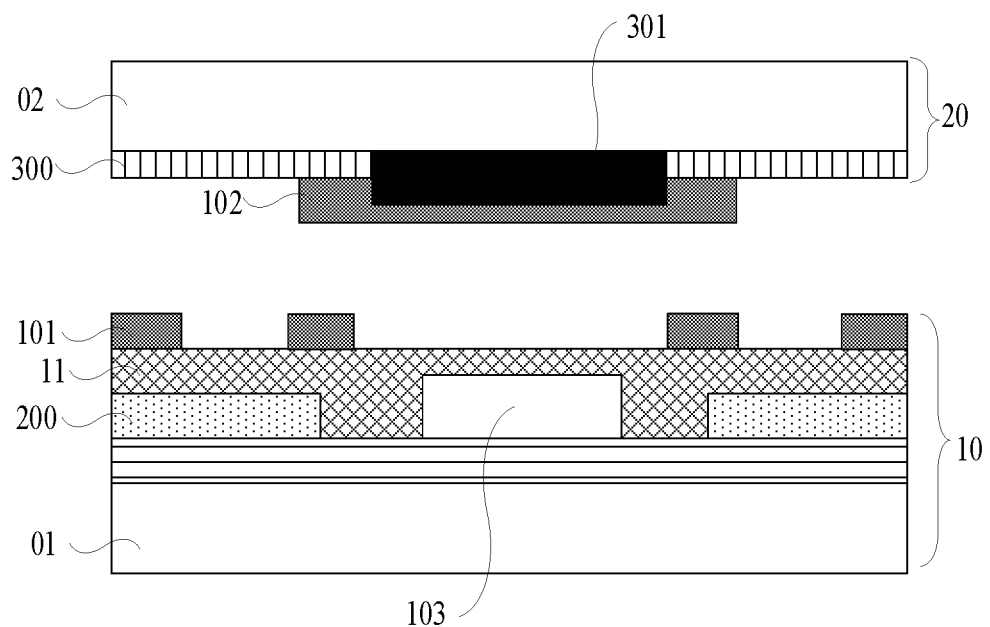
FIG. 1 is a longitudinally sectional schematic view of a display panel provided by an embodiment of the present disclosure.

The technical solutions in embodiments of the present disclosure will be described below in a clear and complete manner with reference to the accompanying drawings schematically showing the embodiments. It is obvious that the described embodiments are merely a part of the embodiments of the present disclosure, rather than all of them. All other embodiments obtained by a person having ordinary skill in the art based on the embodiments of the present disclosure without spending inventive efforts fall within the scope of protection of the present disclosure.

Reference numerals: 01—first base substrate; 02—second base substrate; 10—first substrate; 20—second substrate; 101—first common electrode; 102—second common electrode; 1021—first strip sub-electrode; 1022—second strip sub-electrode; 200—pixel electrode; 300—color filter layer; 301—black matrix; 302—sealant; 3021—conductive gold ball; 303—spacer; 304—liner layer; 11—insulating layer.

A TFT-LCD is provided with a pixel electrode and a common electrode, and the purpose of controlling the deflection direction of the liquid crystal is achieved by controlling the magnitude of an electric field generated by the pixel electrode and the common electrode. In order to increase the aperture ratio of the pixel, those skilled in the art propose a high aperture ratio advanced super dimensional switch (HADS) type liquid crystal display. However, in the HADS type liquid crystal display, the overlapping area of the data line and the common electrode is relatively large, thus the parasitic capacitance generated between the data line and the common electrode is relatively large. Consequently, under the influence of the RC delay of the parasitic capacitance, the common voltage in the panel is attenuated with the increase of the distance to the common voltage input terminal increases, so that the common voltage charged to a common electrode located in an area farther from the common voltage input terminal is relatively small, resulting in a relatively serious greenish phenomenon in the above area during display. Moreover, as the resolution increases, the above greenish phenomenon will become more and more serious, thereby degrading the display quality.

Figure 2:
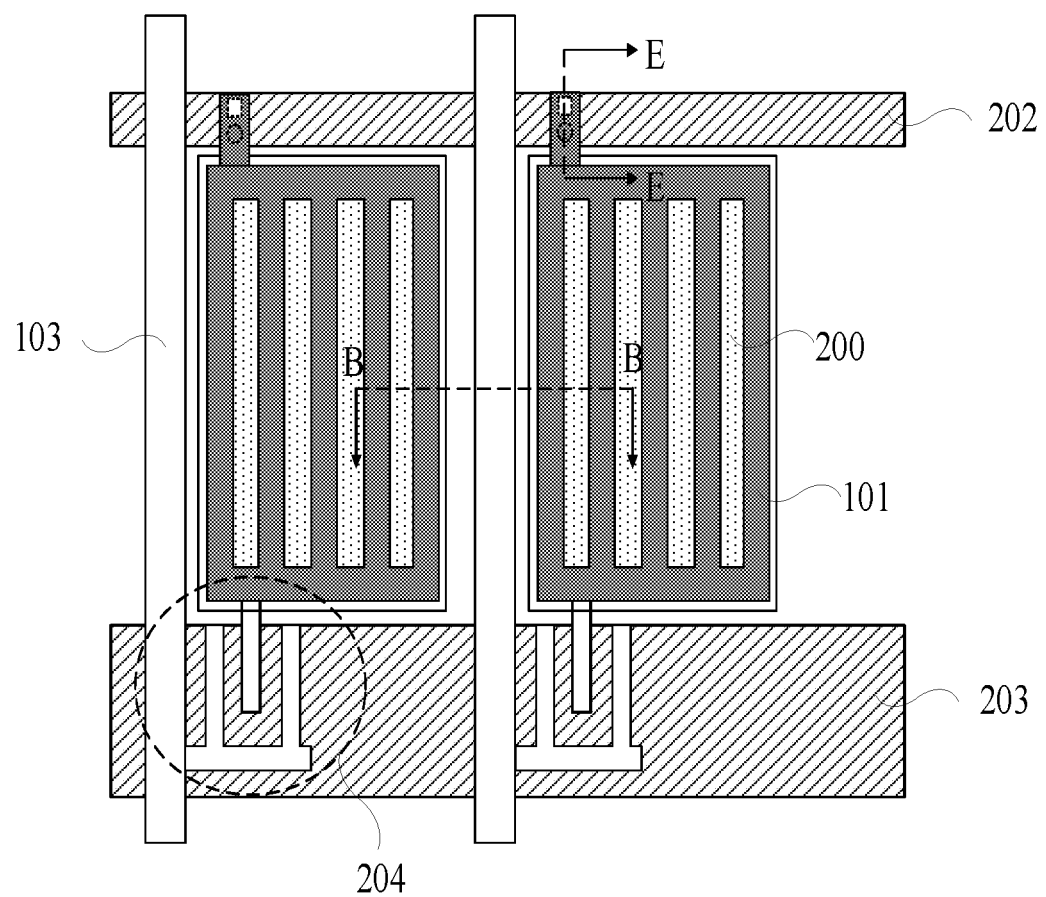
FIG. 2 is a top view of a first substrate in FIG. 1.

FIG. 1 is a cross sectional view obtained by cutting along line B-B in FIG. 2. Embodiments of the present disclosure provide a display panel including, as shown in FIG. 1, a first substrate 10 and a second substrate 20 disposed opposite to each other. The first substrate 10 is provided with a first common electrode 101 and a pixel electrode 200 disposed in different layers. The first common electrode 101 is closer to the second substrate 20 than the pixel electrode 200. Further, the orthographic projection of the first common electrode 101 on the first substrate 10 has no overlapping area with a data line 103 103 on the first substrate 10.

It is to be noted that the first substrate 10 is an array substrate, and the second substrate 20 is a substrate for assembling (i.e. forming cell). After the first substrate 10 is assembled with the second substrate 20, a liquid crystal cell is formed for being injected with liquid crystal to form a liquid crystal layer. When the second substrate 20 is provided with a color filter layer 300, the color filter layer 300 can filter white light emitted from a backlight source disposed on the non-emitting side of the display panel, so that the display panel can display a color image. In this case, the second substrate 20 is a color film substrate. The color filter layer 300 includes a plurality of color filter units arranged in a form of a matrix. Each color filter unit includes at least three color filter sub-units, such as an R (red) filter sub-unit, a G (green) filter sub-unit, and a B (blue) filter sub-unit.

In addition, the shape of the first common electrode 101 is like a slit, as shown in FIG. 2, and the pixel electrode 200 disposed on the first substrate 10 in a different layer from the first common electrode 101 is a planar electrode. The pixel electrode 200 is connected to a source or a drain of the TFT 204 to receive a data voltage output from the data line 103. Further, the first common electrode 101 is connected to a common electrode line 202 through a via hole to receive a common voltage output from the common electrode line 202.

On such basis, the second substrate 20 is provided with a second common electrode 102. The second common electrode 102 is electrically connected to the first common electrode 101 so that the second common electrode 102 is equipotential to the first common electrode 101. This reduces the probability of display unevenness caused by the potential difference.

After the first substrate 10 is assembled with the second substrate 20, the orthographic projection of the second common electrode 102 on the first substrate 10 has an overlapping area with the data line 103 on the first substrate 10.

It is to be noted that the overlapping area between the orthographic projection of the second common electrode 102 on the first substrate 10 and the data line 103 may be an area where part of the above orthographic projection overlaps the entirety or part of one data line 103, or an area where the entirety of the above orthographic projection overlaps the entirety or part of the data line 103, which is not limited herein.

As can be seen, on the one hand, the first substrate 10 is provided with both the first common electrode 101 and the pixel electrode 200. The pixel electrode 200 is a planar electrode, and the first common electrode 101 is a slit electrode. In this way, a multi-dimensional electric field is formed by the electric field generated at the edge of the slit electrode and the electric field generated between the slit electrode and the planar electrode in the same plane, so that all of the orientation liquid crystal molecules between corresponding slits in the liquid crystal cell, as well as at positions between the slit electrodes and the planar electrodes can be rotated, thereby improving the working efficiency of the liquid crystal molecules and increasing the light transmission efficiency.

On the other hand, since the display panel has the first common electrode 101 on the first substrate 10 and the second common electrode 102 on the second substrate 20, and the orthographic projection of the first common electrode 101 on the first substrate 10 has no overlapping area with the data line 103 while the second common electrode 102 has an overlapping area with the data line 103, therefore, among the common electrodes of the display panel only the second common electrode 102 is capable of forming a parasitic capacitance with the data line 103. The second common electrode 102 and the data line 103 are located on different substrates respectively. After the first substrate 10 is assembled with the second substrate 20, a gap needs to be left between the first substrate 10 and the second substrate 20, so that the liquid crystal can be filled through the gap into the cell to form a liquid crystal layer. Therefore, the distance between the upper substrate and the lower substrate of the parasitic capacitance formed by the data line 103 and the second common electrode 102 is relatively large. As a result, the parasitic capacitance can be reduced, so that the influence of the RC delay of the parasitic capacitance on the display effect can be decreased, thereby reducing the probability of occurrence of the greenish phenomenon during display.

In yet another exemplary embodiment, the second substrate 20 is provided with a second common electrode 102 which is conductive, and the second common electrode 102 is electrically connected to the first common electrode 101. Therefore, static electricity generated during the manufacturing or use of the display panel may be led out to the first common electrode 101 by the second common electrode 102 on the second substrate 20, and then further led out to the ground by the first common electrode 101. Consequently, the probability of occurrence of an electrostatic breakdown phenomenon in the second substrate 20 is reduced.

The arrangement of the second common electrode 102 will be illustrated below by way of example.

Figure 3:
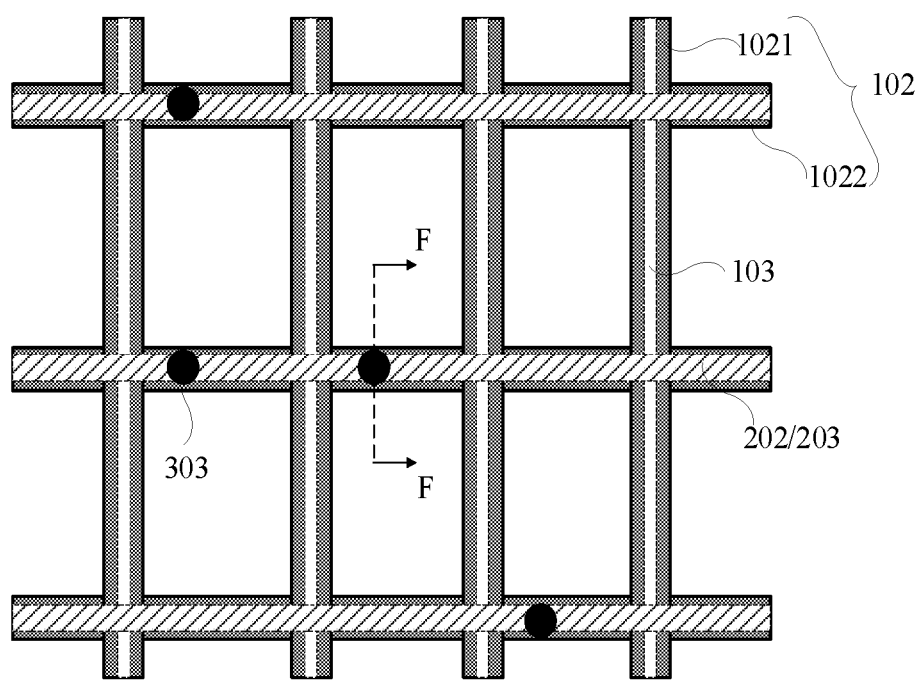
FIG. 3 is a structural schematic view of a second common electrode on a second substrate in FIG. 1.

The orthographic projection of the second common electrode 102 on the first substrate 10 has an overlapping area with the data lines 103 on the first substrate 10. Therefore, for example, as shown in FIG. 3, the second common electrode 102 includes a plurality of first strip sub-electrodes 1021 that are parallel to the data lines 103. In addition, after the first substrate 10 is assembled with the second substrate 20, each of the first strip sub-electrodes 1021 completely covers each of the data lines 103. It is to be noted that the covered pattern in FIG. 3 is indicated by a broken line.

In this case, since the first strip sub-electrode 1021 completely covers one data line 103, the line width of the first strip sub-electrode 1021 is larger than that of the data line 103. Specifically, as shown in FIG. 3, when the line width of the first strip sub-electrode 1021 is larger than that of the data line 103, part of the orthographic projection of the first strip sub-electrode 1021 on the first substrate 10 overlaps the entirety of the data line 103. Alternatively, when the line width of the first strip sub-electrode 1021 is equal to that of the data line 103, the entirety of the orthographic projection of the first strip sub-electrode 1021 on the first substrate 10 overlaps the entirety of the data line 103. In this way, the first strip sub-electrode 1021 can shield the electric field generated by the data line 103 to the greatest extent, thereby may avoiding the light leakage phenomenon resulting from the liquid crystal deflection disorder caused by the electric field inconsistency around the data line 103.

In this case, the above light leakage phenomenon is effectively suppressed. Therefore, the line width of a black matrix 301 (shown in FIG. 1) on the second substrate 20 can be appropriately reduced. That is, the line width of the black matrix 301 corresponding to the position of the data line 103 may be the same as or approximately the same as that of the data line 103, which helps to obtain a better aperture ratio.

On such basis, since the line width of the first strip sub-electrode 1021 is larger than that of the data line 103, the line width of the first strip sub-electrode 1021 is larger than that of the black matrix 301. The second common electrode 102 is located on a side of the black matrix 301 close to the first substrate 10. Specifically, the difference between the one-sided line width of the first strip sub-electrode 1021 and that of the black matrix 301 is 1.5 µm to 2.5 µm. The one-sided line width of the first strip sub-electrode 1021 here does not refer to the total line width, but refers to the line width at either side of the extending direction of the first strip sub-electrode. For a strip-shaped first strip sub-electrode, the one-sided line width refers to half of its total line width.

As described above, in order to reduce the parasitic capacitance formed by the data line 103 and the second common electrode 102 to the greatest extent, each data line 103 is completely covered by a corresponding first strip sub-electrode 1021, for example.

On such basis, since the second common electrode 102 is electrically connected to the first common electrode 101, in order to make the conductivity of the second common electrode 102 on the second substrate 20 uniformly distributed, the second common electrode 102, for example, further includes a plurality of second strip sub-electrodes 1022 disposed crosswise with the first strip sub-electrodes 1021. In addition, after the first substrate 10 is assembled with the second substrate 20, one second strip sub-electrode 1022 completely covers one gate line 203 or one common electrode line 202 on the first substrate 10. The first strip sub-electrode 1021 and the second strip sub-electrode 1022 are made of the same material in the same layer, so that the first strip sub-electrode 1021 is electrically connected to the second strip sub-electrode 1022.

The gate line 203 and the data line 103 are disposed in an intersecting manner, and the common electrode line 202 and the gate line 203 are disposed parallel to each other.

In this way, the first strip sub-electrodes 1021 and the second strip sub-electrodes 1022 disposed crosswise may form a mesh-like second common electrodes which has the same conduction performance in the lateral direction and the longitudinal direction, and uniformly distributed conductivity. During display of the display panel, common voltages of the sub-pixels are made equal to improve display evenness.

The style of the electrical connection between the first common electrode 101 and the second common electrode 102 will be illustrated below by way of example.

Figure 4:
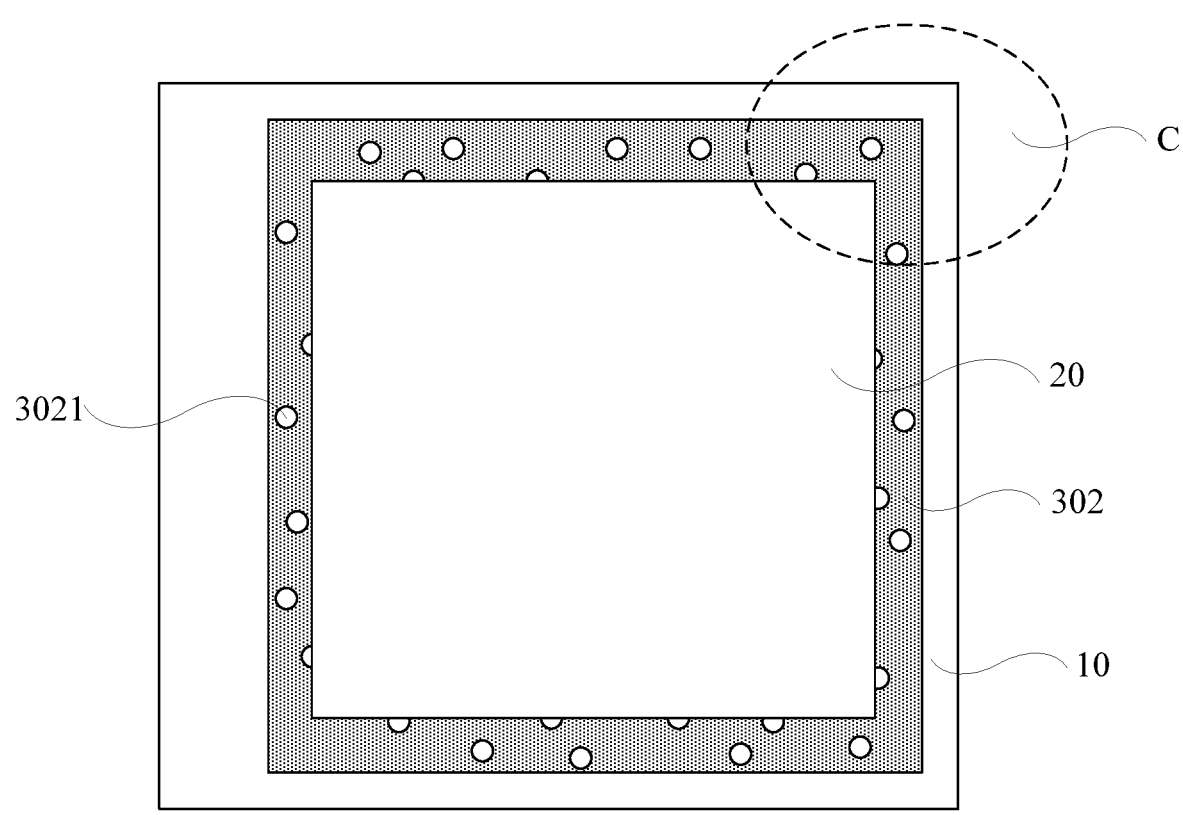
FIG. 4 is a top view of a display panel provided by an embodiment of the present disclosure.

On one hand, in order to electrically connect the first common electrode 101 to the second common electrode 102 in the non-display area of the display panel, the display panel, for example, further includes a sealant 302 between the first substrate 10 and the second substrate 20 as shown in FIG. 4. One side of the sealant 302 is in contact with the first common electrode 101 on the first substrate 10, and the other side is in contact with the mesh-like second common electrode 102 on the second substrate 20.

Figure 5:
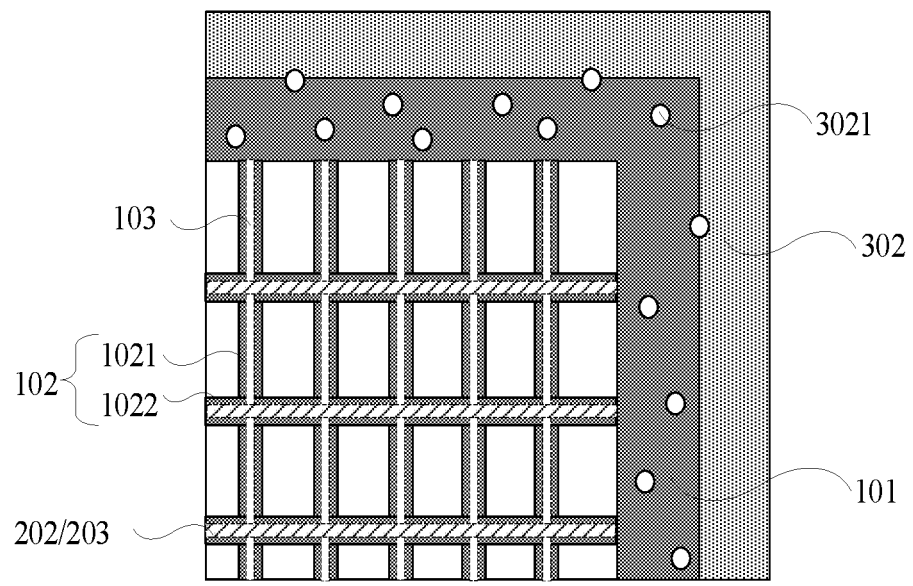
FIG. 5 is a partial structural schematic view of a display panel in FIG. 4.

FIG. 5 is a partial enlarged view of the area C in FIG. 4. As shown in FIG. 5, conductive gold balls 3021 are uniformly distributed in the sealant 302. The conductive gold balls 3021 are used to electrically connect the first common electrode 101 to the second common electrode 102. The material that constitutes the conductive gold ball 3021 may be a metal material having a low resistivity, e.g., any one of metallic silver and metallic copper.

In this way, the peripheral area of the first common electrode 101 on the first substrate 10 may be electrically connected to that of the second common electrode 102 on the second substrate 20 by means of the sealant 302 provided with the conductive gold balls 3021.

On such basis, due to the influence of the capacitance formed by the data line 103 and the second common electrode 102, there is a slight difference between the common voltage of the display area and the common voltage of the peripheral area, which is disadvantageous for improvement of display evenness. Therefore, for example, the first common electrode 101 is electrically connected to the second common electrode 102 in the display area.

Figure 6:
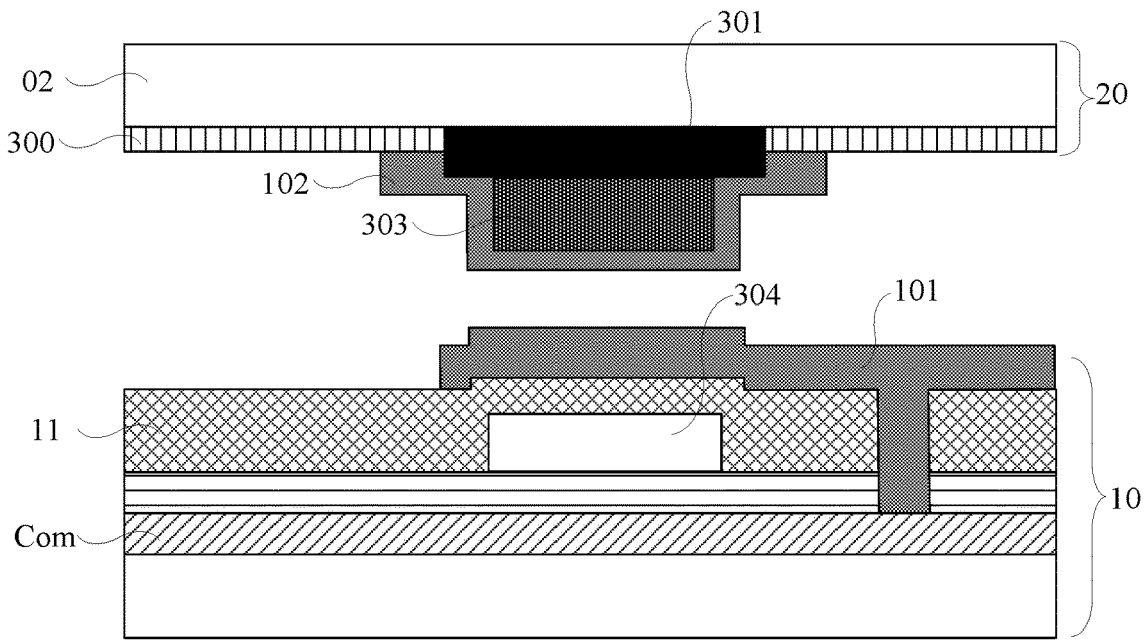
FIG. 6 is a schematic view showing a structure after a partial structure of a first substrate obtained by cutting along line E-E in FIG. 2 is aligned with a partial structure of a second substrate obtained by cutting along line F-F in FIG. 3.

Specifically, a partial sectional view of the first substrate 10 as shown in the lower portion of FIG. 6 is obtained by cutting along E-E as shown in FIG. 2. Further, a partial sectional view of the second substrate 20 as shown in the upper portion of FIG. 6 is obtained by cutting along F-F as shown in FIG. 3. On such basis, as shown in FIG. 6, a plurality of spacers 303 are disposed in the display area on the second substrate 20. The spacer 303 is located on a side of the second strip sub-electrode 1022 facing away from the first substrate 10 and corresponds to the position of the second strip of sub-electrodes 1022 so that the second strip sub-electrode 1022 completely covers the spacer 303. After the first substrate 10 is assembled with the second substrate 20, the spacers 303 are used to support the first substrate 10 and the second substrate 20 so that the liquid crystal cell formed after assembly can maintain a certain cell thickness.

In this way, after the first substrate 10 is assembled with the second substrate 20, the second strip sub-electrode 1022 at the position provided with the spacer 303 can be brought into contact with the first common electrode 101 on the first substrate 10, thereby electrically connect the first common electrode 101 and the second common electrode 102 in the display area.

Furthermore, since the position of spacer 303 corresponds to the position of the second sub-electrode 1022 and the second sub-electrode 1022 corresponds to the position of the gate line 203 or the common electrode line 202 on the first substrate 10, after the first substrate 10 is assembled with the second substrate 20, the second common electrode 102 corresponding to the position of the data line 103 still has a certain distance (i.e. the cell thickness described above) from the data line 103, even if the first common electrode 101 and the second common electrode 102 are contact with each other via the spacer 303 so that the distance between the gate line 203 or the common electrode line 202 and the second common electrode 102 decreases. Therefore, even if the first common electrode 101 is electrically connected to the second common electrode 102 in the display area via the spacer 303, the parasitic capacitance between the second common electrode 102 and the data line 103 will not be increased.

It is to be noted that, in embodiments of the present disclosure, one spacer 303 may be disposed at a position of each sub-pixel corresponding to the second strip sub-electrode 1022, or a plurality of sub-pixels may be provided with one spacer 303. No limitation is imposed on the distribution of spacers 303 in the present disclosure, as long as the spacers 303 are evenly distributed.

Further, the material constituting the spacer 303 may be a resin material. Alternatively, since the first common electrode 101 and the second common electrode 102 are usually made of a transparent conductive material, and the transparent conductive material has a large resistivity, therefore, in order to improve the conduction efficiency of the first common electrode 101 and the second common electrode 102, for example, the material constituting the spacer 303 may be a metal material having a low resistivity, so that the resistivity of the second common electrode 102 can be reduced.

On such basis, for example, as shown in FIG. 6, on the first substrate 10, a liner layer 304 is disposed on a side of the first common electrode 101 facing away from the second substrate 10. The liner layer 304 corresponds to the position of the spacer 303. The liner layer 304 can increase the thickness of the film layer on the surface of a side of the first substrate 10 close to the second substrate 20, so that the first substrate 10 can be brought into better contact with the spacer 303 on the second substrate 20, which in turn helps to improve the uniformity of the gap in the liquid crystal cell. In this case, the height and distribution density of the spacers 303 can be appropriately reduced to simplify the preparation process of the spacers 303.

On such basis, in order to simplify the process for manufacturing the liner layer 304, for example, the liner layer 304 and the data line 103 are made of the same material in the same layer, so that the liner layer 304 can be prepared while manufacturing the data line 103.

Furthermore, the first common electrode 101 is connected to the common electrode line 202 through another via hole so that the first common electrode 101 can receive a common voltage output from the common electrode line 202.

An embodiment of the present disclosure provides a display device including any of the display panels described above. It has the same beneficial effects as the display panel provided by the foregoing embodiments, which will not be described repeatedly herein.

It is to be noted that, in embodiments of the present disclosure, the display device may specifically include a liquid crystal display device. For example, the display device may be any product or component having a display function, such as a liquid crystal display, a liquid crystal television, a digital photo frame, a mobile phone, or a tablet computer.

An embodiment of the present disclosure provides a method for manufacturing a display panel, including the steps of manufacturing the first substrate 10 and the second substrate 20 as shown in FIG. 1.

Figure 7:
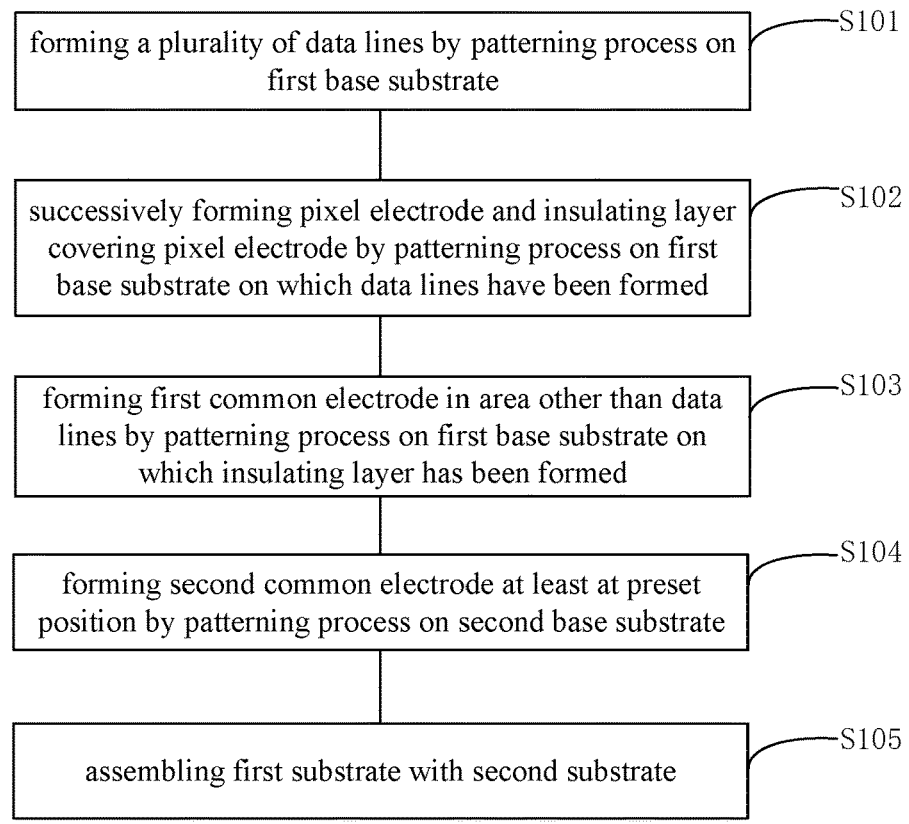
FIG. 7 is a flowchart of a method for manufacturing a display panel provided by an embodiment of the present disclosure.

As shown in FIG. 7, the step of manufacturing the first substrate 10 includes the steps of:

S101, forming, on a first base substrate 01, a plurality of data lines 103 by a patterning process;

S102, successively forming, on the first base substrate 01 on which the data lines 103 have been formed, a pixel electrode 200 and an insulating layer 11 covering the pixel electrode 200 by a patterning process;

S103, forming, on the first base substrate 01 on which the insulating layer 11 has been formed, a first common electrode 101 in an area other than the data lines 103 by a patterning process.

It is to be noted that the patterning process in the present disclosure may include a photolithography process, or include a photolithography process and an etching step, and may also include other processes for forming a predetermined pattern, such as printing, inkjet, and the like. The photolithography process refers to a process for forming a pattern by means of a photoresist, a mask plate, an exposure machine, or the like, including processes of film formation, exposure, development, and the like. A patterning process can be selected correspondingly in accordance with the structure formed in the present disclosure.

The single patterning process in embodiments of the present disclosure is illustrated based an example in which different exposure regions are formed in a single mask exposure process, and then subjected to removable processes such as etching, ashing, and the like for multiple times to finally obtain an expectant pattern.

Further, the step of manufacturing the second substrate 20 includes the step of:

S104, forming, on a second base substrate 02, a second common electrode 102 at least at a preset position by a patterning process.

In addition, the method for manufacturing a display panel further includes S105, assembling the first substrate 10 with the second substrate 20.

After assembling, the preset position corresponds to the position of the data line 103, so that the orthographic projection of the second common electrode 102 on the first substrate 10 has an overlapping area with the data line 103 on the first substrate 10.

It is to be noted that the above method for manufacturing a display panel has the same beneficial effects as the display panel provided by the foregoing embodiments, and the repeated description is omitted herein.

The step of manufacturing the second common electrode 102 will be illustrated below by way of example.

Figure 8:
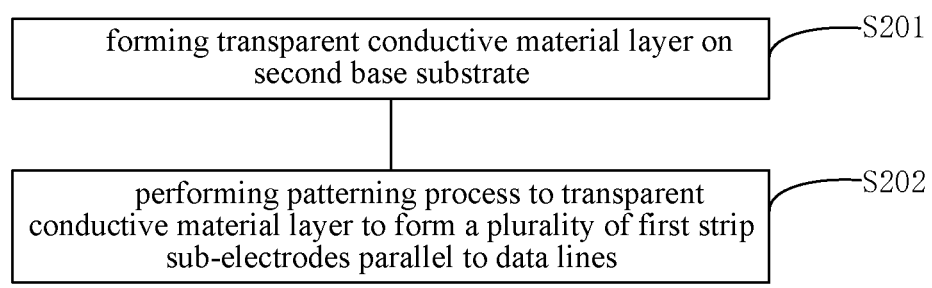
FIG. 8 is a schematic diagram showing a specific process of step S104 in FIG. 7.

As shown in FIG. 8, the step S104 includes:

S201, forming a transparent conductive material layer on the second base substrate 02.

The material constituting the transparent conductive material layer includes at least one of indium tin oxide (ITO) and indium zinc oxide (IZO).

S202, performing a patterning process on the transparent conductive material layer to form a plurality of first strip sub-electrodes 1021 parallel to the data lines 103 as shown in FIG. 3.

After the first substrate 10 is assembled with the second substrate 20, each of the first strip sub-electrodes 1021 completely covers a corresponding one of the data lines 103.

In this case, since the first strip sub-electrode 1021 completely covers one data line 103, the line width of the first strip sub-electrode 1021 is larger than that of the data line 103. In this way, the first strip sub-electrode 1021 can shield the electric field generated by the data line 103 to the greatest extent, thereby avoiding the light leakage phenomenon resulting from the liquid crystal deflection disorder caused by the electric field inconsistency around the data line 103.

As described above, in order to reduce the parasitic capacitance formed by the data line 103 and the second common electrode 102 to the greatest extent, for example, each data line 103 is completely covered by one first strip sub-electrode 1021.

On such basis, the method for manufacturing the first substrate 10 further includes forming, on the first base substrate 01, a plurality of gate lines 203 and common electrode lines 202 as shown in FIG. 3 by a patterning process. On such basis, since the second common electrode 102 is electrically connected to the first common electrode 101, therefore, after the step S201, for example, the step S104 includes performing a patterning process on the transparent conductive material layer to form a plurality of second strip sub-electrodes 1022 arranged to intersect with the first strip sub-electrode 1021 as shown in FIG. 3 in order to make the conductivity of the second common electrode 102 on the second substrate 20 uniformly distributed.

After the first substrate 10 is assembled with the second substrate 20, one second strip sub-electrode 1022 completely covers one gate line 203 or one common electrode line 202 on the first substrate 10. In addition, since the first strip sub-electrode 1021 and the second strip sub-electrode 1022 are made of the same material in the same layer, the first strip sub-electrode 1021 is electrically connected to the second strip sub-electrode 1022.

In this way, mesh-like second common electrodes 102 can be formed by arranging the first strip sub-electrodes 1021 and the second strip sub-electrodes 1022 in an intersecting manner, so that the second common electrode 102 has the same conduction performance in the lateral direction and the longitudinal direction, making the conductivity distributed uniformly. During display of the display panel, common voltages for the sub-pixels are made equal to improve display evenness.

The manner for arranging the electrical connection between the first common electrode 101 and the second common electrode 102 will be illustrated below by way of example.

On one hand, in order to electrically connect the first common electrode 101 to the second common electrode 102 in the non-display area of the display panel, for example, the step S105 includes: forming a sealant 302 on the first substrate 10 or the second substrate 20 by a patterning process, as shown in FIG. 4. Conductive gold balls 3021 are distributed evenly in the sealant 302.

One side of the sealant 302 is in contact with the first common electrode 101 on the first substrate 10, and the other side is in contact with the mesh-like second common electrode 102 on the second substrate 20. The conductive gold balls 3021 are used for electrically connecting the first common electrode 101 to the second common electrode 102. The material constituting the conductive gold ball 3021 is the same as that described above, and will not be described herein again.

In this way, the peripheral area of the first common electrode 101 on the first substrate 10 may be electrically connected to that of the second common electrode 102 on the second substrate 20 by disposing the sealant 302 provided with the conductive gold balls 3021.

On such basis, due to the influence of the capacitance formed by the data line 103 and the second common electrode 102, there is a slight difference between the common voltage of the display area and the common voltage of the peripheral area, which is disadvantageous for improvement of display evenness. Therefore, for example, the first common electrode 101 and the second common electrode 102 are electrically connected in the display area.

Specifically, the method for manufacturing the second substrate 20 further includes prior to forming a plurality of second strip sub-electrodes 1022 arranged to intersect with the first strip sub-electrodes 1021, as shown in FIG. 6, forming a plurality of spacers 303 on the second base substrate 02 and in the display area. The position of the spacer 303 is corresponding to that of the second strip sub-electrode 1022, such that the second strip sub-electrode 1022 completely covers the spacer 303.

After the first substrate 10 is assembled with the second substrate 20, the spacers 303 are used to support the first substrate 10 and the second substrate 20 so that the liquid crystal cell formed after assembling can maintain a certain cell thickness.

In this way, after the assembling of the first substrate 10 and the second substrate 20, the second strip sub-electrode 1022 at the position provided with the spacer 303 can be brought into contact with the first common electrode 101 on the first substrate 10, thereby realizing electrical connection between the first common electrode 101 and the second common electrode 102 in the display area.

In addition, the material constituting the spacer 303 is the same as that described above, and will not be described herein again.

On such basis, the method for manufacturing the first substrate 10 further includes for example: prior to the step S102, forming, on the first base substrate 01, a plurality of data lines 103 shown in FIG. 1 and a liner layer 304 shown in FIG. 6 by a single patterning process.

The position of the liner layer 304 corresponds to that of the spacer 303.

In this way, the thickness of the film layer on the surface of a side of the first substrate 10 close to the second substrate 20 can be increased by the liner layer 304, so that the first substrate 10 can be brought into better contact with the spacer 303 located on the second substrate 20, which in turn helps to improve the uniformity of the gap in the liquid crystal cell. In this case, the height and distribution density of the spacers 303 can be appropriately reduced to simplify the preparation process of the spacers 303.

On such basis, the data line 103 and the liner layer 304 are formed by a single patterning process, so that the liner layer 304 can be prepared while the data line 103 is being formed, thereby simplifying the process for manufacturing the liner layer 304.

Embodiments of the present disclosure provide a display panel, a method for manufacturing a display panel, and a display device. The display panel includes a first substrate and a second substrate disposed opposite to each other. The first substrate is provided with a first common electrode and a pixel electrode disposed in different layers, and the first common electrode is closer to the second substrate than the pixel electrode. A second common electrode is disposed on the second substrate, and is electrically connected to the first common electrode. The orthographic projection of the second common electrode on the first substrate has an overlapping area with a data line on the first substrate, and the orthographic projection of the first common electrode on the first substrate has no overlapping area with the data line.

As described above, on the one hand, the first substrate is provided with both the first common electrode and the pixel electrode, the pixel electrode is a planar electrode, and the first common electrode is a slit electrode. In this way, by means of a multi-dimensional electric field formed by the electric field generated at the edge of the slit electrode and the electric field generated between the slit electrode and the planar electrode in the same plane, all of the orientation liquid crystal molecules between corresponding slits in the liquid crystal cell, as well as between the slit electrodes and the planar electrodes can be rotated, thereby improving the working efficiency of the liquid crystal molecules and increasing the light transmission efficiency. On the other hand, since the display panel has the first common electrode at the first substrate and the second common electrode at the second substrate, and the orthographic projection of the first common electrode on the first substrate has no overlapping area with the data line, and the second common electrode has an overlapping area with the data line, therefore, among the common electrodes of the display panel, only the second common electrode is capable of forming a parasitic capacitance with the data line. Moreover, the second common electrode and the data line are located on different substrates respectively, and after the first substrate is assembled with the second substrate, a gap needs to be left between the first substrate and the second substrate, through which the liquid crystal is filled to form a liquid crystal layer. Therefore, the distance between the upper substrate and the lower substrate of the parasitic capacitance formed by the data line and the second common electrode is relatively large. As a result, the above parasitic capacitance can be reduced, so that the influence of the RC delay of the parasitic capacitance on the display effect can be decreased, thereby reducing the probability of occurrence of a greenish phenomenon during display.

What have been stated above are only specific embodiments of the present disclosure, but the protection scope of the present disclosure is not so limited. Variations or replacements that can be easily conceived by any skilled person familiar with this technical field within the technical scope revealed by the present disclosure shall be encompassed within the scope of the present disclosure. Thus, the protection scope of the present disclosure shall be based on the scope of the appended claims.

We claim:

1. A display panel comprising a first substrate and a second substrate disposed opposite to each other, wherein the first substrate is provided with a first common electrode and a pixel electrode disposed in different layers, and the first common electrode, compared to the pixel electrode, is closer to the second substrate;

wherein the second substrate is provided with a second common electrode, and the second common electrode is electrically connected to the first common electrode, wherein the second common electrode comprises a plurality of first strip sub-electrodes parallel to the data lines, and each of the first strip sub-electrodes completely covers a corresponding one of the data lines;

wherein the second common electrode further comprises a plurality of second strip sub-electrodes which are crosswise disposed with respect to and electrically connected to the first strip sub-electrodes, and each of the second strip sub-electrodes completely covers a corresponding gate line or a corresponding common electrode line on the first substrate, wherein the second substrate comprises a black matrix, the second common electrode is located on a side of the black matrix close to the first substrate, and a line width of each of the first strip sub-electrodes and a line width of each of the second strip sub-electrodes are larger than a line width of the black matrix;

wherein an orthographic projection of the second common electrode on the first substrate has an overlapping area with data lines on the first substrate, and an orthographic projection of the first common electrode on the first substrate has no overlapping area with the data lines; and wherein a difference between one-sided line widths of each of the first strip sub-electrodes and the black matrix ranges from 1.5 μm to 2.5 μm.

2. The display panel according to claim 1, further comprising a sealant between the first substrate and the second substrate, wherein a first side of the sealant is in contact with the first common electrode and a second side of the sealant opposite to the first side is in contact with the second common electrode; and wherein a plurality of conductive gold balls are uniformly distributed in the sealant, and the plurality of conductive gold balls are used to electrically connect the first common electrode and the second common electrode.

3. A display device comprising the display panel according to claim 1.

4. The display panel according to claim 1, wherein a plurality of spacers for supporting the first substrate and the second substrate are disposed on the second substrate and in a display area, wherein the spacers are located on a side of the second strip sub-electrode facing away from the first substrate, and correspond to a position of the second strip sub-electrode.

5. The display panel according to claim 4, wherein the spacer comprises a metallic material.

6. The display panel according to claim 4, further comprising a sealant between the first substrate and the second substrate, wherein a first side of the sealant is in contact with the first common electrode and a second side of the sealant opposite to the first side is in contact with the second common electrode; and wherein a plurality of conductive gold balls are uniformly distributed in the sealant, and the plurality of conductive gold balls are used to electrically connect the first common electrode and the second common electrode.

7. The display panel according to claim 4, wherein on the first substrate, a liner layer is disposed on a side of the first common electrode facing away from the second substrate and corresponds to position of the spacer.

8. The display panel according to claim 7, further comprising a sealant between the first substrate and the second substrate, wherein a first side of the sealant is in contact with the first common electrode and a second side of the sealant opposite to the first side is in contact with the second common electrode; and wherein a plurality of conductive gold balls are uniformly distributed in the sealant, and the plurality of conductive gold balls are used to electrically connect the first common electrode and the second common electrode.

9. A method for manufacturing a display panel, comprising:

manufacturing a first substrate, manufacturing a second substrate, and assembling the first substrate with the second substrate; wherein manufacturing the first substrate comprises: forming a plurality of data lines and a liner layer by a single first patterning process on a first base substrate, successively forming a pixel electrode and an insulating layer covering the pixel electrode by a second patterning process on the first base substrate on which the data lines have been formed, and forming a first common electrode in an area other than the data lines by a third patterning process on the first base substrate on which the insulating layer has been formed; wherein manufacturing the second substrate comprises: forming a second common electrode at least at a preset position by a fourth patterning process on a second base substrate, and forming a plurality of spacers on the second substrate and in a display area, wherein position of the spacers corresponds to a position of the liner layer; and wherein assembling the first substrate with the second substrate comprises: assembling the first substrate with the second substrate so that the preset position corresponds to a position of the data line.

10. The method according to claim 9, wherein assembling the first substrate with the second substrate comprises: forming a sealant by a fifth patterning process on the first substrate or the second substrate, wherein a plurality of conductive gold balls are uniformly distributed in the sealant, wherein a first side of the sealant is in contact with the first common electrode, and a second side of the sealant opposite to the first side is in contact with the second common electrode, and wherein the plurality of conductive gold balls electrically connect the first common electrode with the second common electrode.

11. The method according to claim 9, wherein forming the second common electrode at least at the preset position comprises: forming a transparent conductive material layer on the second base substrate; and performing the fourth patterning process to the transparent conductive material layer to form a plurality of first strip sub-electrodes parallel to the data lines, wherein after the first substrate is assembled with the second substrate, each of the first strip sub-electrodes completely covers a corresponding one of the data lines.

12. The method according to claim 11, wherein manufacturing the first substrate further comprises: forming a plurality of gate lines and first common electrode lines by the third patterning process on the first base substrate, and wherein forming the second common electrode at least at the preset position further comprises: after forming the transparent conductive material layer, performing the fourth patterning process to the transparent conductive material layer to form a plurality of second strip sub-electrodes crosswise disposed with respect to the first strip sub-electrodes, wherein positions of the second strip sub-electrodes correspond to the positions of the spacers, and after the first substrate is assembled with the second substrate, each of the second strip sub-electrodes completely covers a corresponding one of the gate lines or a corresponding one of the common electrode lines.

* * * * *